United States Patent [19]

Riffiod et al.

[11] Patent Number: 4,661,818

[45] Date of Patent: Apr. 28, 1987

[54] ELECTRONICALLY ADJUSTABLE DELAY-SIMULATOR FOR DISTANCE-MEASURING APPARATUS OPERATING ON THE FREQUENCY-MODULATED CONTINUOUS WAVE PRINCIPLE

[75] Inventors: Michel Riffiod, Fontènay aux Roses; Jean-Pierre Tomasi, Les Molieres, both of France

[73] Assignee: Telecommunications Radio-Electriques et Telephiques (TRT), Paris, France

[21] Appl. No.: 543,066

[22] Filed: Oct. 13, 1983

[30] Foreign Application Priority Data

Oct. 13, 1982 [FR] France ............................... 82 17142

[51] Int. Cl.⁴ .............................................. G01S 7/40
[52] U.S. Cl. ................................................... 342/172
[58] Field of Search ......................... 343/17.7; 342/172

[56] References Cited

U.S. PATENT DOCUMENTS

| 3,150,369 | 9/1964 | Fontana | 342/172 |
| 3,341,849 | 9/1967 | Cordry et al. | 342/173 X |
| 4,121,213 | 10/1978 | Bush et al. | 342/172 |
| 4,319,247 | 3/1982 | Warren | 342/172 X |
| 4,590,477 | 5/1986 | Regnier et al. | 342/173 |

Primary Examiner—T. H. Tubbesing
Attorney, Agent, or Firm—Stevens, Davis, Miller & Mosher

[57] ABSTRACT

A simulator is provided for testing a radio altimeter of the type which emits a frequency-modulated wave, the modulation being according to linear segments of slope p, and which compares the frequencies of the emitted wave and of the wave which is received after reflection to provide a distance measurement. The simulator according to the invention is connected between the transmitting antenna and the receiving antenna of the altimeter, and comprises two signal-processing chains which are arranged, in parallel, between a receiving section and an SSB mixer, the output terminal of which is connected to a transmitting section. The first chain is formed by first devices, which generate a quantity G, which is proportional to p, and second devices, which generate a signal possessing a frequency $f_d$, the ratio of $f_d$ and G assuming a predetermined, adjustable ratio, Q. The second chain is formed by a coupler which is connected to a variable attenuator. The SSB beats substractively between the two signals which it receives.

10 Claims, 10 Drawing Figures

ELECTRONICALLY ADJUSTABLE DELAY-SIMULATOR FOR DISTANCE-MEASURING APPARATUS OPERATING ON THE FREQUENCY-MODULATED CONTINUOUS WAVE PRINCIPLE

The invention relates to a delay-simulator for distance-measuring apparatus, in particular altimeters, operating on the frequency-modulated continuous wave principle, the modulation being linear, the said apparatus, when in actual operation, comparing the frequencies of the emitted wave and of the wave which is received after reflection on a target, or after retransmission by a transponder, the said simulator being intended to be connected to the said apparatus in order to test its operation.

The invention is used for testing distance-measuring apparatus and, more particularly, for testing radio altimeters. By way of a preferred example, interest will be concentrated, in the remainder of this text, on distances which may vary from 0 to 16 km (0 to 50,000 feet), or more, and which radio altimeters, of the type known as FM-CW radio altimeters, are intended to measure, these altimeters operating in a frequency band covering several hundreds of MHz and centred on several GHz, for example the band between 4.2 and 4.4 GHz. A radio altimeter of this type, using other operating frequencies, is described in French Patent No. 1,557,670 and U.S. Pat. No. 3,588,899.

Before a radio altimeter is put into service, it is necessary to test it and, in particular, to check its accuracy. In the known method, delay lines are used to this end, the delay time $\tau_s$ of these lines being known to a high degree of accuracy. Each delay line represents a simulated distance, $D_s$, according to the formula:

$$D_s = (C\tau_s)/2 \qquad (1)$$

c being the velocity of an electromagnetic wave in air. In practice, when a delay line is connected to a radio altimeter, it delays the wave, transmitted by the latter, by a time $\tau_s$ and, as far as the radio altimeter is concerned, the entire process takes place as if the wave had been transmitted through the air, reflected by an obstacle situated at a distance $D_s$ from the radio altimeter, and picked up by the receiving antenna on its return, over the same distance $D_s$ (in this comparison, as far as the wave is concerned, only the functions involving the frequency as a function of time are of interest, it being assumed that the problems relating to the attenuation of the signal between the transmitting and receiving antennae have been solved). This method for testing a radio altimeter is accurate, but, due to the cost and the volume of the necessary delay lines, it is impossible to assemble them in sufficient numbers to allow the accuracy to be tested at a large number of altitudes (distances). In practice, this accuracy is, therefore, tested only at a few points, which are always the same, taking the chance of failing to detect faults which may appear only within limited zones of altitude. It will be noted, moreover, that even if it is desired to obtain a delay line which would permit the radio altimeter to be tested at a specific, predetermined distance value, $D_s$, this is difficult to achieve, unless it is possible to carry out a sorting operation on a rather large number of delay lines which have been designed in order to produce a delay, $\tau_s$, of a predetermined value corresponding to the distance value in question, it being impossible to know the precise value of the delay time, $\tau_s$, of a delay line prior to its manufacture, since this value has to be measured. The principal object of the invention is to simulate, for a distance-measuring apparatus of the FM-CW type, all the altitudes included within a range of distances covering several km, or even several tens of km, in steps of a value ranging between a few tens of cm and several m.

This object is achieved, and the disadvantages of the prior art are avoided, by virtue of the fact that the simulator, as defined in the introduction, permits the simulation of a delay in the wave emitted by the apparatus, which delay can be varied electronically, the delays being capable of amounting to several tens of thousands of different predetermined values. To attain this objective, the invention comprises two signal-processing chains which are arranged, in parallel, between a receiving section and a single-sideband mixer, the output terminal of which is connected to a transmitting section, the first chain being formed by first devices for generating a first signal, the frequency, $f_{ref}$, of this signal being proportional to the slope of the straight line defining the frequency-modulation, and by second devices, for generating, from the said first signal, a second signal possessing a frequency $f_d$ such that the ratio of $f_d$ and $f_{ref}$ assumes a predetermined value which can be adjusted from a unit displaying the distance simulated, the second chain being formed by a coupler which is connected to a variable attenuator, controlled from the display unit, the single-sideband mixer beating subtractively between the wave received by the simulator, after amplitude-calibration, and the second signal.

In the radio altimeter under consideration, both the modulation-frequency excursion $\Delta F$ and the beat frequency $f_b$, between the emitted waves and the received waves, are kept constant, and equal to predetermined values, as a result of which only the duration, T, of the modulation sawtooth varies, this duration representing the distance D which is to be measured (and therefore, in an inversely proportional manner, the sawtooth slope, p). The principle on which the invention is based resides in operating a loop arrangement, between the transmitting and receiving antennae of the apparatus to be tested, which arrangement is implemented by means of a signal-processing chain in which a quantity G is proportional to the slope p of the modulation sawtooth, and in which the quantity G is, thereafter, multiplied by a number Q which possesses a predetermined value, this value preferably being variable in steps. Under these conditions, the result is that QG remains constant, and the number Q represents the distance to be simulated (subject to a proportionality factor).

According to a preferred embodiment of the simulator according to the invention, the second devices are formed by the series-arrangement of a phase-locked loop, which receives the first signal and is provided, in particular, with a programmable divider, dividing by the factor M, and at least one loop filter, and of a programmable divider which enables the frequency of the loop output signal to be divided by an integer N, in a manner such that the ratio of the frequencies, $f_d$ and $f_{ref}$, the value of which is predetermined, is equal to M/N.

According to another preferred embodiment of the simulator, the second devices are formed by the series-arrangement of a frequency-to-voltage converter, at least one low-pass filter, a programmable voltage attenuator, and a voltage-controlled oscillator.

In these two embodiments, the first devices are preferably formed by the parallel-connection, between the receiving section and a mixer, of a reference delay-line, of value $\tau_{ref}$, and of a conductor which picks off a fraction of the received signal, by means of a coupler, the mixer beating subtractively between its two input signals, in order to generate the first signal at the frequency $f_{ref}$.

Of the two abovementioned embodiments, the second one is the easier to implement, and is the more economical, granted the large frequency-ranges applicable to the signals which have to be processed in the second chain, by the second devices. On the other hand, the first embodiment, which comprises a phase-locking loop (phase-synchronization), is more accurate than the second embodiment.

The description which follows is referred to the attached drawings, the whole being given by way of an example, will provide a good understanding of how the invention can be implemented.

On the Figures, the same reference numbers designate the same elements, or equivalent elements having the same functions.

Figure 1:
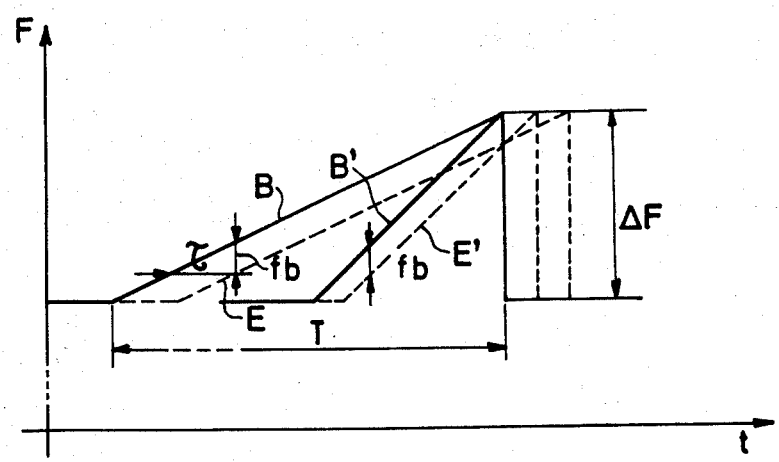
FIG. 1 is a graph in which the frequencies of the waves emitted and received by a radio altimeter of the FM-CW type are plotted as a function of time.

The distance-measuring apparatus, namely the radio altimeter for which the delay-simulator according to the invention is intended, emits a frequency-modulated continuous wave, the modulation being linear, as represented at B in FIG. 1. The curve B, which represents the frequency F of the emitted signal, as a function of time, is formed by positive ramps, separated by unmodulated, level portions, thereby forming an asymmetric, recurrent sawtooth. The frequency-excursion of the sawtooth $\Delta F$, is preferably kept constant. In order to clarify these concepts, it will be assumed, in the text which follows, that the value of $\Delta F$ is equal to 120 MHz, and that the frequency F varies from 4.24 to 4.36 GHz. In actual operation, the emitted wave travels a distance D, is reflected by an obstacle, or is retransmitted, following amplification, by a transponder, and is picked up by the receiving antenna of the radio altimeter, in accordance with the curve of frequency as a function of time, represented by the broken line, E, in FIG. 1. The curve E is derived from the curve B by translation, along the time axis, through the amplitude $\tau$, the time $\tau$ being equal to:

$$\tau = (2D)/c \qquad (2)$$

In the radio altimeter, the frequency $f_b$, which represents the subtractive beating between the curves B and E, is also kept constant. In addition, the following relationship exists between the parameters $f_b$, $\Delta F$ and T:

$$\frac{f_b}{\tau} = \frac{F}{T} = \frac{d(F)}{dt} = p \qquad (3)$$

T and p being, respectively, the duration and the slope of the sawtooth. On combining formulae (2) and (3), the following formula is obtained:

$$D = \frac{c}{2} \cdot \frac{T}{\Delta F} f_b \qquad (4)$$

From formula (4), it emerges that, when the parameters $f_b$ and $\Delta F$ are constant, the distance D is proportional to T. In other words, the time T constitutes a measurement of D. On the other hand, formula (4) can be written:

$$D \cdot p = \frac{c}{2} f_b = C^{te} \qquad (5)$$

In the radio altimeter under consideration, the product of the distance to be measured and the slope of the sawtooth is a constant. This means that, in actual operation, the slopes of the straight lines B and E are going to be abruptly modified in the event of passing abruptly from one distance to be measured, to another distance (passage of an aircraft over a cliff, for example), this modification occurring so as to match the new distance to be measured by altering $\tau$, $f_b$ remaining constant. For example, if the distance is halved, the curves B' and E' are obtained. The two drawings, B and E on the one hand, and B' and E' have been superposed in order to allow a simple graphical construction, and to facilitate the comparison.

It will be noted, moreover, that it would, in effect, be equivalent to pass from the curve B, to the curve E, by a vertical translation, of amplitude $f_b$. However, since this single shift suits all the possible values for the slope of the sawtooth, and therefore suits all the distances to be simulated, it is impossible to obtain, in this way, the simulation of a distance having a predetermined value.

Figure 2:
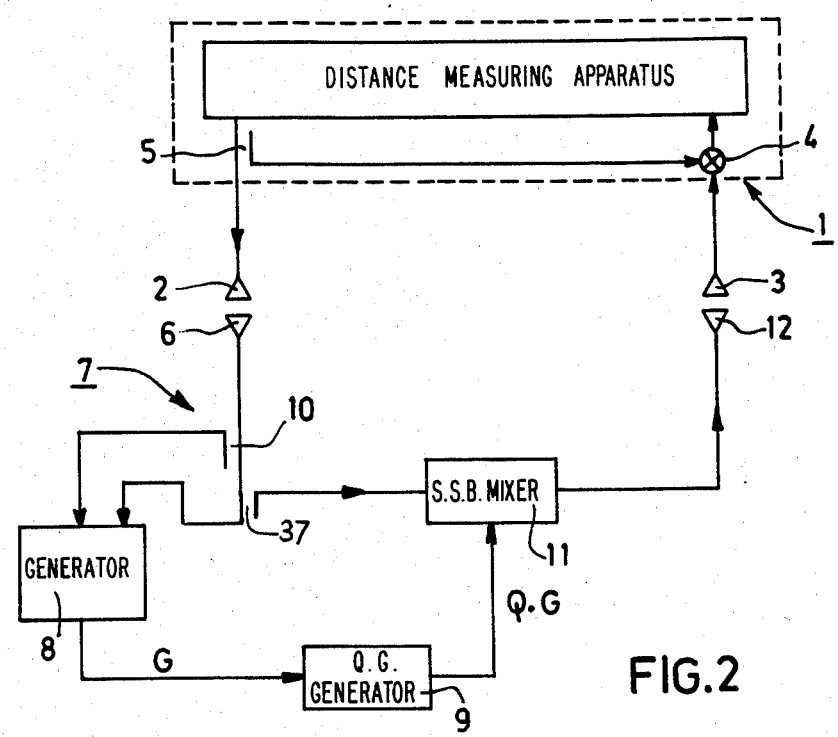
FIG. 2 is a block diagram which enables the operating principle of the simulator according to the invention to be explained.

Rather, the physical meaning of the formula (5) leads to the operating principle of the simulator according to the invention, which is illustrated by FIG. 2.

In FIG. 2, the distance-measuring apparatus which is to be tested, and which is of a known type, is represented, at 1, inside a frame, drawn with a broken line. The apparatus 1 comprises transmitting devices formed by a transmitting antenna 2, and/or a coaxial tapping, and receiving devices formed by a receiving antenna 3, and/or a coaxial tapping. In the apparatus, subtractive beating takes place in a mixer 4, for example a diode-type mixer, between a fraction of the emitted wave, which is picked off from the emission channel by means of a coupler 5, and the received wave. A regulating element, operating in a known manner and located inside the apparatus 1, keeps the frequency $f_b$ of the beat signal constant, this signal being obtained at the output terminal of the mixer 4.

The starting concept of the invention involves the generation, starting from the signal emitted at 2, of a quantity G, which is to be proportional to the slope p of the sawtooth. According to FIG. 2, this function is implemented by picking off, by means of a coupler 10, a fraction of the emitted signal, received by the receiving antenna 6 of the simulator 7, as well as a fraction of the signal which is actually emitted, followed by appropriate processing in an element 8. The quantity G is then multiplied by a quantity Q, which can be varied, in a programmable manner, in an element 9, in a manner such that the product Q.G is measurable by using a unit of frequency. In practice, the product Q.G represents a low frequency, $f_d$, which is very close to the beat frequency $f_b$ of the apparatus 1, and the frequency-values of the signals present in the processing chain formed by the elements 8 and 9 are relatively low (ranging from Hz to MHz), compared to the frequencies of the signals which are emitted and received by the apparatus 1 (GHz). In order to obtain a signal which can be identified as an echo signal corresponding to a given distance (simulated distance, $D_s$, represented by the quantity Q in this particular case), the signal of frequency Q.G is mixed with the signal emitted by the apparatus 1, mixing being effected in a single-sideband mixer 11 (SSB mixer), which generates the subtractive beating between the high-frequency signal F, picked off by means of a coupler 37, and the signal of frequency $f_d$, that is to say a simulator output-signal at the frequency $F-F_d$. This simulator output-signal is transmitted, by the emitting antenna 12 of the simulator, to the receiving antenna 3 of the apparatus 1. The regulation, effected by the apparatus 1, on the beat frequency, $f_b$, between the emitted wave and the received wave, is such that the frequency Q.G=$f_d$ remains effectively constant, irrespective of whatever value may be assigned to the quantity (to the number ) Q. For the loop system formed jointly by the apparatus 1 and the simulator 7, this means that, when the value of Q is modified by a certain proportion, the value of G, that is to say the value of the slope p, as well, is modified in inverse proportion. Thus, by simulation, the apparatus 1 is caused to function in a manner which is effectively identical to that in which it would, in reality, operate in order to measure varying distances, this mode of operation being described by formula 5. Transposed to the simulator, formula 5 can be written:

$$D_s p = K f_d \qquad (6)$$

k being a constant.

Preferably, the quantity G, which is proportional to p, is homogeneous, at one frequency, and is obtained, as described above by reference to FIG. 3, in which the portions of the simulator other than the element 8 are not represented. In this case, the element 8 comprises two signal input terminals, which are identical insofar as the frequency of the signals is concerned, a first input terminal being connected to the coupler 10, and a second input terminal being connected directly to the receiving antenna 6 of the simulator, which may either be a receiving antenna or a coaxial tapping. In the element 8, the first input terminal is connected directly to a mixer 13, for example a diodetype mixer, and the second input terminal is connected to a second input terminal of the mixer 13, via a reference delay line 14, the value of which, $\tau_{ref}$, is known as a result of a measurement performed by an accurate method. The mixer 13 mixes the wave which has been delayed in 14, and the wave which has not been delayed. The mixture of these two waves produces a beat signal, of frequency $f_{ref}$, such that:

$$f_{ref} = \tau_{ref} p \qquad (7)$$

since the value $\tau_{ref}$ is fixed, and known, it is possible to obtain the slope p directly, by measuring the frequency $f_{ref}$.

In this preferred case, the quantity $f_{ref}$ becomes identified with the quantity G of FIG. 2, which is then homogeneous, at one frequency. The consequence of this is that the quantity Q can then be a simple, dimensionless number, preferably variable in steps.

Figure 3:
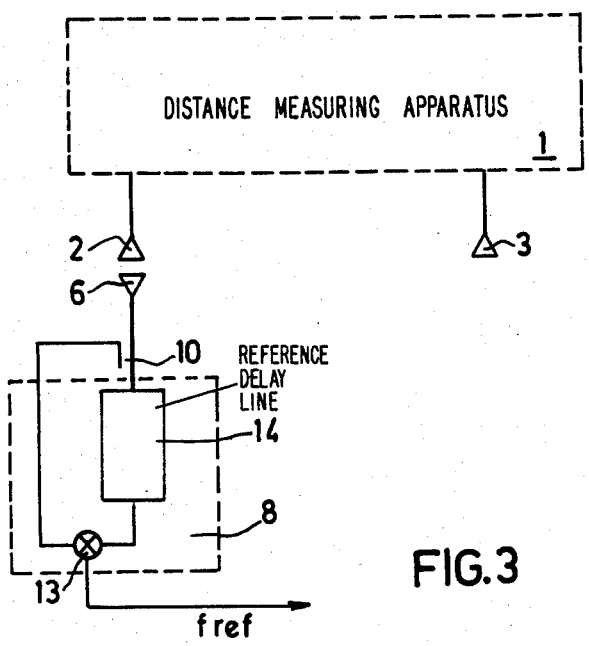
FIG. 3 is the block diagram of a preferred embodiment of the first devices for generating a quantity which is proportional to the slope of the straight line defining the frequency-modulation.

Two preferred embodiments are described below, by reference to FIGS. 4, 5 and 6, these embodiments corresponding to two different designs of the element 9, which are compatible with the element 8 represented in FIG. 3. In order to simplify the drawing, the distance-measuring apparatus 1 is not represented in the diagrams forming FIGS. 4 and 5.

Figure 4:
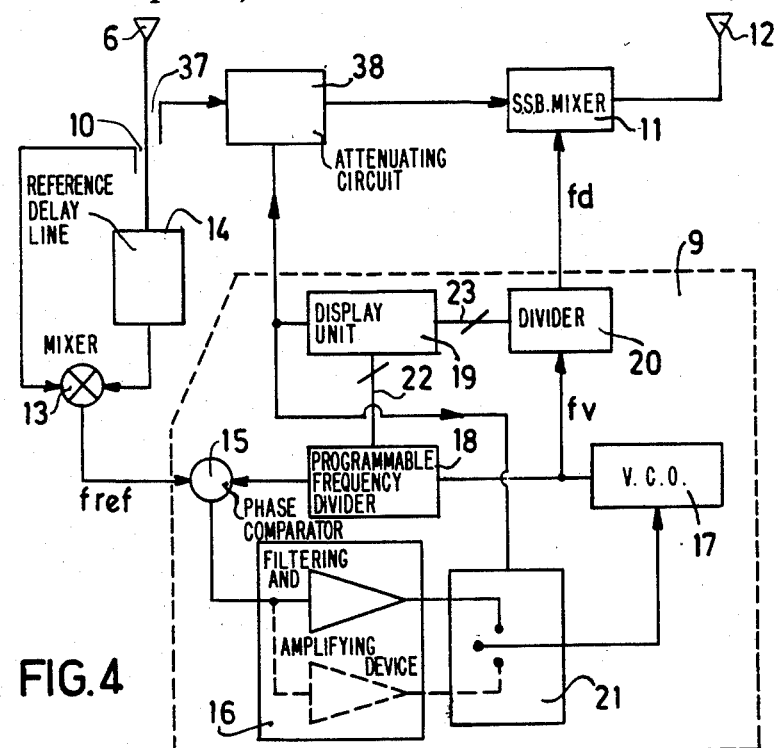
FIG. 4 is the block diagram of a first embodiment of the simulator.

The element 9, shown in FIG. 4, essentially comprises a phase-locked loop, which is formed, in a known manner, by a phase comparator 15, a filtering and amplifying device 16, a voltage-controlled oscillator 17 (VCO), and a programmable frequency-divider 18, which is controlled from a display unit 19 for displaying the distance simulated, $D_s$. At one reference input terminal, the comparator 15 receives the output signal from the mixer 13, at the frequency $f_{ref}$, and, at another input terminal, receives the output signal from the VCO 17, after division by an integer M across the divider 18. After filtering and amplification in 16, the output signal from the comparator 15 controls the VCO 17. The frequency, $f_v$, of the output signal from the VCO 17 is thus bound to a multiple of the frequency $f_{ref}$, obtaining the relationship:

$$f_v = M f_{ref} \qquad (8)$$

According to a simplified embodiment, it is possible to identify the number M with the quantity Q (that is to say $f_v = f_d$). However, this would result in a low-performance delay-simulator, which would be capable of functioning only over a rather limited range of distances. In fact, several factors affect the functioning of the phase-locked loop, decreasing the attractiveness of this simplified embodiment. In the first place, under these circumstances, the distance-variation step is equal to $c.\tau_{ref}/2$, which leads, for the applications which are envisaged, where the step is of the order of 1 foot (0.325 m), or 10 feet (3.25 m), to very small values of $\tau_{ref}$, namely 2.15 ns or 21.5 ns. From this, it follows that the values of $f_{ref}$ are themselves very small. The consequence of this is that the acquisition time of the phase-locked loop, at the beginning of each sawtooth, is too long, and that, moreover, the voltage signal for controlling the VCO becomes difficult to filter. In a more general way, the use of a phase-locked loop, in the simulator, is subject to two problems, namely the wide range of variation of the frequency $f_{ref}$, which results from a large variation in p, in association with the fact that the reference signal, at the frequency $f_{ref}$, is chopped in time with the modulation.

These problems can be solved by four methods, three of which are mutually compatible, namely the interposition, between the output terminals of the VCO 17 and of the SSB mixer 11, of a divider, marked 20, which divides by an integer N, the use of several loop amplifying-filters, which can be switched as a function of the distance $D_s$ displayed at 19, as indicated by the circuit-changing switch 21, the utilization, which is known, of several VCO, at 17, the frequency ranges of which partially overlap, and, if appropriate, the use of several reference delay-lines, which can be switched from the display element 19, and which are associated with an equivalent number of different phase-loops. The first three methods are mutually compatible.

Introducing the divider 20 into the circuit enables the frequency $f_{ref}$ to be increased, by multiplying it by a factor N relative to the previous case. In effect, the number Q is then equal to M/N, and not to N, the simulated-distance step then becoming:

$$\Delta D_s = (c\tau_{ref})/(2N) \qquad (9)$$

This enables the phase-locked loop to exhibit an acceptable acquisition time, even for the shortest distances to be simulated. In order to clarify these concepts, it will be admitted that, in order to ensure correct functioning of the system formed by the apparatus 1 and the simulator 7, the acquisition time must not exceed 10% of the duration of the sawtooth, this time effectively corresponding to the duration of the transitional conditions for establishing the linear frequency-modulation of the wave emitted by the apparatus, starting from the end of a nil-modulation period, and account is taken of the fact that frequency-locking the VCO 17 is just as suitable as phase-locking, since the apparatus 1 does not take account of the phase of the modulation. Moreover, it can be noted that the number of sinusoidal oscillations for each sawtooth, at the frequency $f_{ref}$, is a constant, this characteristic deriving from the fact that the formula (3) is transposed to the simulator, which amounts to rewriting the formula (8) in another form:

$$(f_{ref})/(\tau_{ref}) = (\Delta F)/T \qquad (10)$$

or, alternatively:

$$f_{ref}T = \Delta F \cdot \tau_{ref} = K' \qquad (11)$$

k' being a constant, namely the product of the two constants $\Delta F$ and $\tau_{ref}$.

As an example of a numerical application, let it be supposed that: $k' = 1,300$ sinusoidal oscillations ($\Delta F = 120$ MHz, and $\tau_{ref} = 10.83 \mu s$.)

If the phase-loop comprises only one filter (acquisition-time constant, and distance-range limited), it can be foreseen that the system will be critical for the smallest distances simulated, for which the values of $f_{ref}$ are the highest. It will therefore be necessary to ensure, for these smallest distances, that the number of sinusoidal oscillations, at the frequency $f_{ref}$, occurring during the acquisition time, is not excessively high, for which reason it is necessary to provide a relatively large range of values for $f_{ref}$. In practice, in order to cover a large range of distances, for example from 0 to 50,000 feet, several loop amplifying-filters are necessary, this fact being indicated in FIG. 4 by the filter which is represented, in the filtering device 16, by broken lines, and by the presence of the circuit-changing switch 21. Each filter (low-pass) enables the parasitic modulation, at the frequency $r_{ref}$, to be rejected, for a given band of frequencies within which $f_{ref}$ may fall (adjacent bands), subject to the assumption that the closed phase-loop behaves as a band filter.

In order to be able to obtain a correct loop acquisition-time, the value of $\tau_{ref}$ must be sufficiently high, but not, however, excessively high, since if it were too high, the frequencies of the VCO, equal to $M \cdot f_{ref}$, could become too large for the high values of M. A known solution for obtaining a large range of frequencies at the output terminal of the VCO, capable of reaching several hundreds of MHz, consists of using, in a known manner, several elementary VCOs, at 17, (FIG. 9) with overlapping ranges, the switching from one elementary VCO to the next being carried out automatically under the action of the loop control voltage. As an example of a numerical application, the following values are chosen:

$\Delta F = 120$ MHz
$f_b = 25$ kHz
$\tau_{ref} = 10.83 \mu s$
$\Delta D_s = 32.5$ cm or 3.25 m (namely 1 foot, or 10 feet)
$p_{max} = 0.825 \; 10^{12} s^{-2}$ This choice imposes the following values on N: 5,000 (steps of one foot) or 500 (steps of 10 feet), by reason of the following formula, which is derived from formula (9):

$$N = (c \cdot \tau_{ref})/(2\Delta D_s) \qquad (12)$$

In choosing to vary M between 0 and 5,000, it is thus possible to test over the range of distances from 0 to 5,000 feet, in steps of one foot, or to test over the range from 0 to 50,000 feet, in steps of 10 feet. In the first case, $f_{ref}$ varies from 8.93 MHz to 25 kHz, for a synchronizing frequency, $f_v$, equal to 125 MHz, while in the second case $f_{ref}$ varies from 8.93 MHz to 2.5 kHz, for a synchronizing frequency, $f_v$, equal to 12.5 MHz.

The statements which have been made in the preceding paragraph are true only to a first approximation, since the minimum height which can safely be measured by a radio altimeter is 14 feet, which corresponds to the maximum value of $p_{max}$ indicated previously, and which also corresponds to the 0-feet datum of the radio altimeter and, therefore, also to the 0-feet datum of the simulator. Very strictly speaking, the range of distances from 0 to 5,000 feet is tested, in the first case, with M being varied from 14 to 5,014, and the range of the distances from 6 feet to 50,006 feet is tested, in the second case, with M being varied from 2 to 50,001. A slight systematic error (negligible, however) is thus injected by the simulator, due to the fact that, in the two cases, M is varied over different ranges and, moreover, because the values of N indicated in the preceding paragraph are retained. Another cause of error, which superimposes itself on the one just mentioned, is due to the fact that the cable connecting the two antennae of the simulator possesses a residual delay, $\tau_i$ which is not zero. The beat frequency, $f_b$, which appears inside the radio altimeter is not, therefore, exactly $f_d$, but is the sum of $f_d$ and the beat frequency which would appear as the result of $\tau_i$ alone:

$$f_b = (M/N) \cdot f_{ref} \cdot p + \tau_i p \qquad (13)$$

so that, by reason of formula (7):

$$f_b = \frac{M}{N} \cdot f_{ref} + \frac{\tau_i}{\tau_{ref}} \cdot f_{ref} \qquad (14)$$

or, alternatively, by reason of the fact that:

$$f_{ref} = \frac{M}{N} \cdot f_d \quad (15)$$

$$f_b = f_d \left(1 + \frac{M}{N} \cdot \frac{\tau_i}{\tau_{ref}}\right) \quad (16)$$

Here, $\tau_i$ represents a delay which is of the order of 14 feet, or more. The effect of this parasitic delay is negligible for high values of M/N (equal to, or exceeding, 1). In contrast, for low values of M/N the effect of $\tau_i$ is no longer negligible, and it is advisable to correct the systematic error thus introduced, at the point corresponding to the display, at 19. This can be effected by calibration of the simulator. Continuing with the numerical application, it is seen that, if $f_b = 25$ kHz, and N is equal to 5,000, $f_d$ (which should be constant) varies from 24.93 kHz to 25 kHz when M varies from 14 to 5,014. It will also be noted, moreover, that the error introduced by $\tau_i$ becomes larger as $\tau_{ref}$ becomes smaller.

It is also possible, by assigning a single value to N, for example 5,000, to vary M from 0 to 50,000 (14 to 50,014) for a range of distances simulated, varying from 0 to 50,000 feet. In this case, $f_{ref}$ varies from 8.93 MHz to 2.5 kHz for a synchronizing frequency value, $f_v$ equal to 125 MHz.

Figure 9:
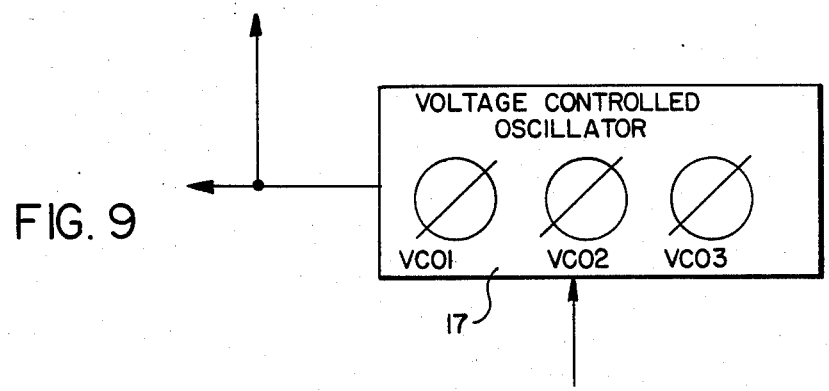
FIG. 9 shows a selectable voltage controlled oscillator which may be used in the invention.
Figure 10:
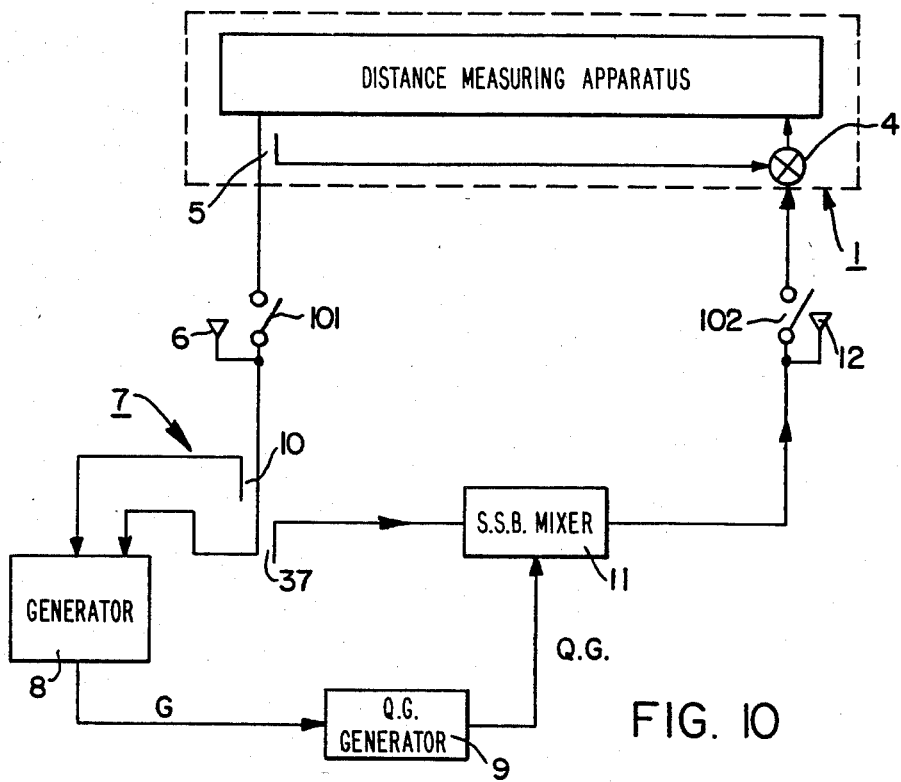

It will be noted that the phase loop operates with a variable input frequency and a fixed output frequency. This mode of operation is the converse of the conventional use, and necessitates the introduction, into the loop, of several switchable amplifying filters (switching of the gain, and of the pass-band of the amplifier, at 16, as a function of the value of the number M). In fact, if N can assume several values, as has been seen above, it becomes necessary to provide a high range of output frequencies for the VCO. On the other hand, it must be noted that the abovementioned frequency calculations have been performed on the basis of the assumption that the apparatus 1 is therefore controlled by an external frequency $f_b$, equal to the value for which provision is made (for example 25 kHz, or 100 kHz). In fact, when voltage is applied to it, the radio altimeter starts to operate by hunting for a certain time, during which period the slope p varies from the maximum to the minimum. During this phase, the frequency $f_v$, which is related to p by the equation:

$$f_v = M \cdot p \cdot \tau_{ref} \quad (17)$$

will be obliged to vary in the same proportion as p and, when M is high, it will start by taking very (excessively) high values for the VCO 17. However, it is not useful for the frequency of the VCO to vary by more than 50% relative to its equilibrium value, for the apparatus under consideration does not take account of beat frequencies, $f_b$, which are too far removed from the nominal value. The system for controlling the VCO may therefore incorporate "stops". For example, it is possible, if required, to use three VCO in association, respectively covering the ranges from 5 to 30 MHz, 25 to 150 MHz and 125 to 750 MHz, as shown in FIG. 9.

Another possible means for varying the range of distances to be simulated consists of the parallel-connection of several reference delay lines in association with a selector, the latter making it possible to pass from one delay line to another, according to the frequency range desired. This variant is not represented in FIG. 4. Let it be assumed, for example that, at 14, either a delay line which produces a delay of 10.83 μs is available, or a delay line which produces a delay of 108.3 μs, and that the value of N is fixed at 5,000. Connecting in the 108.3 μs delay line enables testing to be carried out over the distance range from 0 to 50,000 feet, in steps of 10 feet, $f_{ref}$ varying from 62.5 MHz to 25 kHz, for a synchronizing-frequency value, $f_v$, equal to 125 MHz. It will be noted that, here, two different simulators are involved, since the phase loop must include a group of loop amplifying-filters, at 16, which are different in the two cases.

In the first embodiment, shown in FIG. 4, the presence of a phase loop endows the simulator with high accuracy. This accuracy can be evaluated by means of the following formula:

$$D_s = \frac{C}{2}\left(\frac{M}{N} \cdot \tau_{ref} + \tau_i\right) \quad (18)$$

The error affecting $D_s$ comes almost solely from the error which can affect $\tau_{ref}$. If high accuracy is desired, high values will be chosen for $\tau_{ref}$, which are produced by electroacoustic delay lines (employing bulk waves). With the value of $\tau_{ref}$ chosen for the calculations, namely $\tau_{ref} = 10.83$ μs, it must be possible to obtain (by measurement) an accuracy of the order of 0.1%. Using higher values of $\tau_{ref}$, it must be possible to improve this accuracy still further. The drawback in doing so is that both N (formula (9)) and $f_v$ (formula (17)) are, for a given value of $\Delta D_s$, proportional to $\tau_{ref}$. This technical problem can be resolved by increasing $\Delta D_s$ in the same proportion, which, moreover, corresponds well to a practical application (the range of distances to be scanned is expanded by expanding the scanning step in the same proportion, in a manner such as to keep the number of steps constant, as has been seen in the numerical applications previously described). It is thus possible to design a simulator which comprises a 10.83 μs line in order to check distance-measuring equipment or radio altimeters in steps of 1 foot, to 0.1%, and a second line, rated at 108.3 μs, for carrying out checks to an accuracy better than 0.1%, in steps of 10 feet. The first line could be used, in particular, in a test over a runway (for example of a radio altimeter installed aboard an aircraft), while the second line could be used in the laboratory.

Figure 7:
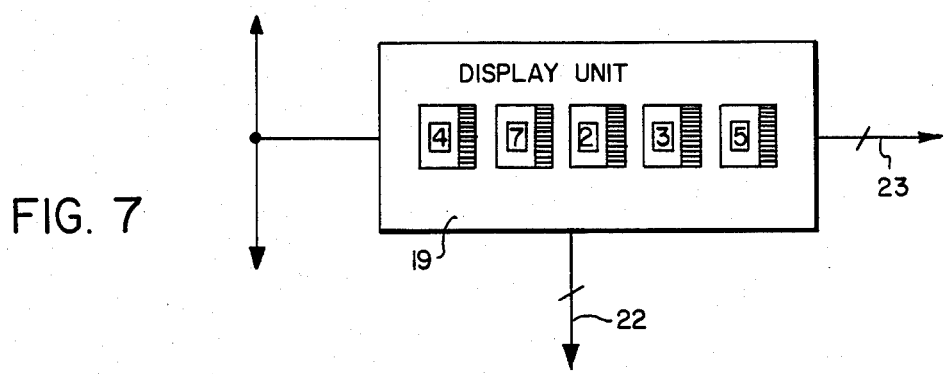
FIG. 7 shows in greater detail the display unit illustrated in FIG. 4.

This embodiment, employing a phase-locked loop, would appear to be very promising in the medium term, by which time the phase loop technology will have been perfected, and the price of a comparatively complicated phase-locked loop, as in the present case, will have become lower. At the present time, having regard to the frequency to be divided (some tens of megahertz), the construction of a programmable divider, capable of dividing any integer between, for example, 10 and 10,000, does not pose any problems. It is possible, for example, to use the Texas Instruments divider, SN 54 196 S, both for the divider 18 and for the divider 20. The display unit 19, FIG. 4, is formed, for example, by coding wheels (FIG. 7), and the display of the number M, at 18, and, if appropriate, of the number N, at 20, is effected by means of logic signals on the multiple conductors 22 and 23 respectively, each of which is denoted by a conductor crossed by an oblique stroke. The circuit-changing switch 21 is preferably an analog-type multiplexer in the form of an integrated circuit, for example the circuit MC 4066 produced by Texas Instruments or RIC, voltage-controlled from the display unit 19.

Figure 5:
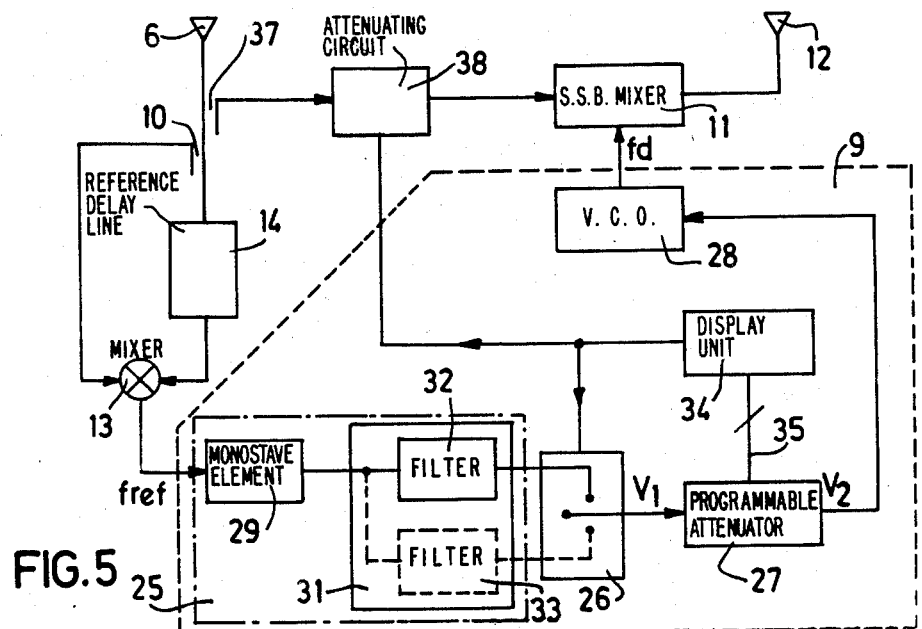
FIG. 5 is the block diagram of a second embodiment of the simulator.

A second embodiment of the simulator is represented in FIG. 5, this embodiment being both more simple and more economical, but a little less accurate than the embodiment shown in FIG. 4. The unit 9, shown in FIG. 5, essentially comprises a numerically programmable attenuator which enables the multiplying factor Q to be input into the processing chain which is formed by the units 8 and 9. Given that this attenuator receives a voltage signal, and that it also outputs a voltage signal, it should be preceded by an element which performs a frequency-to-voltage conversion, while it should be followed, symmetrically, by an element which performs a voltage-to-frequency conversion. The second signal-processing chain is then formed, between the output terminal of the mixer 13 and a first input terminal of the SSB mixer 11, by the connection, in cascade, of a frequency-to-voltage converter (FVC) 25, denoted by a composite rectangle, if appropriate a circuit-changing switch 26, the programmable attenuator 27, and a voltage-controlled oscillator 28.

The converter 25 outputs a voltage signal possessing the frequency $f_{ref}$:

$$V_1 = K_1 \cdot f_{ref} \tag{19}$$

Figure 8:
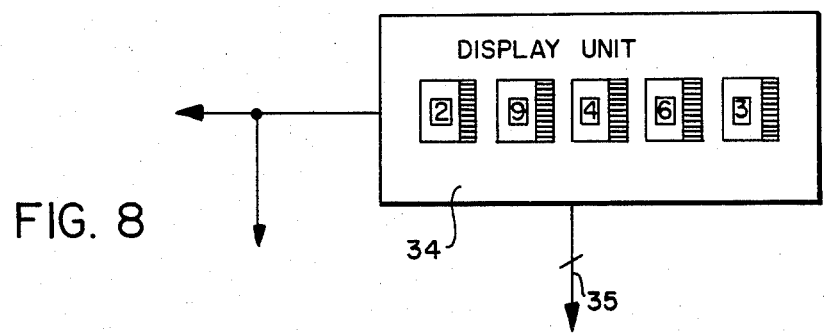
FIG. 8 shows in greater detail the display unit illustrated in FIG. 5.

$K_1$, the conversion factor, being a ratio of proportionality, which can be adjusted between $V_1$ and $f_{ref}$. This converter is formed, for example, in a known manner, by a monostable element 29, followed by a filtering device 31 comprising at least one low-pass filter 32. At each saw-tooth the monostable element 29 produces a series of voltage pulses, of constant width (duration) and constant amplitude, at the frequency $f_{ref}$. The pulse-width is perfectly defined by the presence of a resistor and a capacitor. For example, if the resistor and capacitor have values of 4 k$\Omega$ and 0. $\mu$s respectively, the corresponding pulse-width is approximately 100 ns. The monostable element is, for example, an integrated circuit of the type HEF 4528, which is produced by Texas Instruments, Motorola or RTC. The filter 32 transforms the series of pulses into their mean voltage. A frequency-to-voltage converter, of this type, is easy to construct for the range from 1 kHz to 10 MHz, which is adequate for the applications envisaged, for which the values of $f_{ref}$ could vary, at the most, in a ratio of the order of 1 to 5,000. However, if it is desired to cover the whole of this range of values of $f_{ref}$, it is necessary to arrange several filters, such as the filter 32, in parallel, on the output side of the converter 29, this being indicated in FIG. 5 by the rectangle 33 drawn with a broken line. Switching is carried out, in accordance with the range of distances to be covered, from a display unit 34 (FIG. 8), acting on the selector switch 26, which can be identical to the circuit-changing switch 21 shown in FIG. 4. In this way, a first filter, which has a cut-off frequency in the region of 6 kHz, enables distances ranging from 0 to 500 feet to be tested, while a second filter, which has a cut-off frequency in the region of 25 kHz, enables distances ranging from 500 to 5,000 feet to be tested, and a third filter, exhibiting a cut-off frequency of 100 kHz, enables distances ranging from 5,000 to 50,000 feet to be tested.

The programmable attenuator (DAC) 27 is digitally controlled from the display unit 34, by means of a multiple conductor 35 which carries logic signals (0 or 1). It is possible to use, for example, either the 12-bit DAC 7524, manufactured by Analog Devices or the corresponding 16-bit device the former providing 4,096 test points, and the latter providing 65,536. The transfer function, A of the DAC derives from the conventional formula:

$$V_2 = A \cdot V_1 \tag{20}$$

in which:

$$A = P/(1^n - 1)$$

P being an integer which can vary between 1 and $2^n$. The number of possible steps is equal to $2^n$, each step being equal to:

$$1/(2^n - 1)$$

The output voltage $V_2$ (effectively constant) is then converted to the frequency $f_d$ by means of the VOC 28:

$$f_d = K_2 \cdot V_2 \tag{21}$$

The following numerical application provides a good understanding of how the values of $\tau_{ref}$, $K_1$ and $K_2$ may be determined, and of their influence, as well as that of the choice of n, on the test-distance ranges, and on the value of the distance step $\Delta D_s$.

It is assumed that the values of $\Delta F$, $f_b$, $\Delta D_s$ and $p_{max}$ are the same as those indicated for the first embodiment. The formula which describes $f_d$ as a function of p is:

$$f_d = A \cdot K_1 \cdot K_2 \cdot \tau_{ref} \cdot p \tag{22}$$

Due to the fact that the frequency $f_d$ is effectively constant, and that the maximum value of $V_2$ (a fixed value, in this case) is imposed by the manufacturer of the DAC, it is necessary to select the coefficient $K_2$ between certain limits, which are rather close to each other. Moreover, irrespective of the value of n, the number A, which is a fraction, varies between 0 and 1. The range of distances to be tested may, therefore, be adjusted by means of, in particular, $K_1$ and $\tau_{ref}$, subject to two restrictions, the first concerning the pass-band frequencies of the CFT, for example from 1 kHz to 10 MHz, as has been seen previously, and the second concerning the amplitude of the input signal which has to be catered for at the input terminal of the programmable attenuator 27.

It is possible, for example, to specify $A \cdot K_1 \cdot K_2 = 1$ for $A = 1$. If, then, a delay line having a value $\tau_{ref} = 10.83$ $\mu$s is chosen, the frequency $f_{ref}$ varies, at the input terminal of the CFT, from 25 kHz to 8.93 MHz, for a height-range which is limited to 0–5,000 feet when A varies from 0 to 1. The adjustment, to a range of correct values for the voltage $V_1$ at the input terminal of the attenuator 27, is carried out by adjusting the gain of the filters, at 33 (two switchable filters are necessary).

In order to test the distance-range from 0 to 50,000 feet (three filters), it is then appropriate to select a markedly lower value for $\tau_{ref}$, for example $\tau_{ref} = 1.083$ $\mu$s, which results in $f_{ref}$ varying from 2.5 kHz to 8.93 MHz for a height range running from 0 to 50,000 feet. To the extent that the range of voltages at the input terminal of the attenuator 27 are not critical, and/or the pass-band of the monostable element 29 are not critical, the choice of $\tau_{ref}$ is not critical either.

The distance simulated is expressed by:

$$D_s = \frac{C}{2} \cdot A \cdot K_1 \cdot K_2 \cdot \tau_{ref} \quad (23)$$

and the elementary step by:

$$\Delta D_s = \frac{1}{2^n - 1} \cdot \frac{C}{2} \cdot K_1 \cdot K_2 \cdot \tau_{ref} \quad (24)$$

The step is expressed generally by:

$$\Delta D_s = \frac{b}{2^n - 1} \cdot \frac{C}{2} \cdot K_1 \cdot K_2 \cdot \tau_{ref} \quad (25)$$

b being an integer which is fixed in a manner such as to obtain a step which is a multiple of the elementary step, which can be achieved by means of a simple, known mathematical manipulation within the display unit 34.

Having determined a range of distances to test, by adjustment of the values of $K_2$, $K_1$ and $\tau_{ref}$ as indicated in the preceding paragraphs, an approximate value of the selected step can be determined from the formula (24), for a certain value of a real number $b_1$ (the nearest to the selected step, for example 1 foot or 10 feet). It then suffices to modify, very slightly, the value of $K_1$, and/or of $K_2$, and/or of $\tau_{ref}$, in order to obtain the desired step exactly, corresponding to the integrate value b in the formula (24) (at the expense of a very slight modification of the selected range of distances).

However, this embodiment, which is much simpler and much more economical than the one shown in FIG. 4, is less accurate that this latter embodiment, due to the absence of a control loop. In particular, the monostable element 29 can be subject to drift in the course of time, due to a slow change in the capacity of the capacitor, this slow change being accompanied by a change in the factor K1. It is possible, however, to compensate for the variation in $K_1$, at regular intervals, for example by taking action to alter the conversion factor, $K_2$, of the VCO 28. By way of a variation, it is possible to use a completely digitized monostable element, functioning with very fast counters, at 1 or 2 GHz (MECL technology), this element exhibiting no drift in the course of time. Another source of error, analogous to that which has already been mentioned in the case of the embodiment shown in FIG. 4, is the existence of a parasitic delay, $\tau_i$, due to the connecting cables. The means for attenuating the effects of this systematic error are the same: selection of the highest possible value for $\tau_{ref}$, and modification, with the aid of a calibration procedure, of the values of the simulated distances displayed, at least in the case of the shortest distances.

It will be noted that the programmable attenuator 27 can be controlled by an analog-type arrangement. Control can also be effected by means of a computer. The items marked 19 and 34, in FIGS. 4 and 7 and 5 and 9 respectively, may, in effect, represent a computer. On the other hand, the attenuator 27 may be an adjustable attenuator, reduced to a simple potentiometer.

The frequencies of the signals generated in the simulator have, in particular, been taken into consideration in the case of the embodiments previously described. It must be noted that the amplitude of these signals also has a certain importance. In fact, when a radio altimeter is, for example, operating under practical conditions, the amplitude of the echo signals which it receives decreases very quickly as the distance increases (typically by 6 dB per octave). The simulator must therefore emit, at 12, signals which are also weakened, in the manner of a simulation, as a function of the distance simulated, which is displayed, so that these signals, received by the radio altimeter, may be processed, by the altimeter, in the correct manner, as if they were real echo signals. On the other hand, this simulated echo signal is itself obtained by mixing two signals in the simulator. In order to ensure that there is no risk of the SSB mixer 11, represented in FIGS. 4 and 5, of locking the radio altimeter, in an undesirable manner, onto the beat signal resulting from the addition of parasitic frequencies, it is necessary both that the amplitudes of the two signals which it receives, and the ratio of these amplitudes, remain within ranges of values which are suitable for assuring its proper operation, namely to ensure that the subtractive beat signal is supplied, the amplitude of which decreases as the distance simulated increases. This result is achieved by means of the presence, in the second signal-processing chain, of an attenuating circuit 38, between a coupler 37 and the second input terminal of the SSB mixer 11, as shown in FIGS. 4 and 5, this attenuating circuit 38 being controlled from the display unit 19 and 34 respectively, by the same signal which controls the filter-switching device, 21 and 26 respectively. The attenuating circuit 38 is, for example, preferably of digital design, and contains the attenuation-factor values in a memory circuit, shifting from one value to another being triggered by a change in the control signal. The circuit 38 can also comprise an ultrahigh-frequency attenuator, for example of the PIN diode type.

Figure 6:
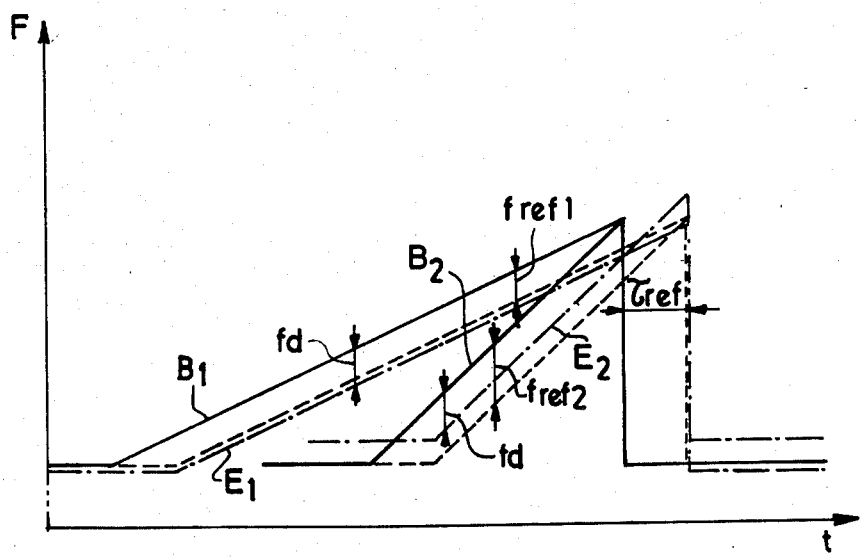
FIG. 6 is a graph in which the frequencies of various signals have been plotted as a function of time, which explains the operation of the first and second embodiments.

The shape of the frequency sawtooth emitted by the apparatus 1 is represented in FIG. 6, by the unbroken line marked $B_1$, in one case, and by the unbroken line marked $B_2$, in another case, and the shape of the simulated echo of this sawtooth is represented by composite lines marked $E_1$ and $E_2$ respectively, in each case for two different values of the distance simulated.

In this Figure, which has been obtained by plotting, the instants corresponding to the ends of the sawteeth have been made to coincide for the two distance values, which facilitates the drawing of the Figure, but which has, of course, no significance with regard to the phase relationship of the two pairs of signals, which are not simultaneous, but have been time-shifted with respect to one another, and are separated by a transitional condition which is not represented FIG. 6 shows the shift from a given distance, $B_1$, $E_1$, to a distance of half the previous amount, $B_2$, $E_2$ (or vice versa). The curves drawn in broken lines enable the frequencies $f_{ref}$ to be represented ($f_{ref2} = 2f_{ref1}$). It will be noted that, for the two cases represented in the Figure, the values of $f_d$ and $\tau_{ref}$ are the same. This Figure is to be compared to FIG. 1, in which the sawtooth, at the frequency of the echo, starts and finishes at frequency values which are constant, and which are also those of the emitted sawtooth. This is not the case for the sawtooth representing the simulated echo, as in FIG. 6, but this slight difference is of no importance with regard to the operation of the apparatus to be tested, and does not falsify its distance-measuring procedure in any way.

In the abovementioned numerical applications, the value $f_b$ has been chosen to be 25 kHz, which is a typical value. More generally, the range over which the frequency $f_b$ may be chosen extends from a few kHz to approximately 200 kHz, this range consequently being that of the frequency $f_d$ as well.

The simulator according to the invention preferably comprises a distance-measuring apparatus of the type previously described. This apparatus is integrated with the simulator, and switching devices are provided for connecting it to the simulator, at 6 and 12. This arrangement amounts to a monitoring system which serves to determine, in the event of a significant divergence between the height which is simulated and displayed, and the height which is measured by the apparatus under test, which of the two units if faulty, namely the simulator, or the apparatus being tested.

We claim:

1. A delay-simulator for testing the accuracy of a distance measuring apparatus operating on the frequency-modulated continuous wave principle comprising:
   means for receiving a distance measuring wave emitted by said apparatus,
   means for providing a simulated reflection wave to said apparatus;
   first and second signal processing paths arranged in parallel between said receiving means and said providing means; said first signal processing path comprising means connected to the output of said receiving means for generating from a received distance measuring wave a first signal, the frequency fref of which is proportional to the slope of a straight line defining a linear frequency modulation of said apparatus, means for generating from the first signal a second signal of frequency fd, the ratio of fd and fref assuming a predetermined value, said means for generating said second signal including means for changing said ratio and thus said predetermined value, and a display means for displaying a simulated distance and including means for controlling said changing means to adjust said predetermined value to correspond with a displayed simulated distance; said second signal processing path comprising a signal coupler connected to said receiving means, and a variable attenuator connected to an output of said coupler, said variable attenuator being controlled by said controlling means; and
   a single-sideband mixer having a first input connected to receive the output of said variable attenuator and a second input connected to receive said second signal, the output of said single-sideband mixer being provided as an input to said means for providing a simulated reflection wave.

2. The delay-simulator claimed in claim 1, wherein said controlling means comprises a group of coding wheels which transmit to said changing means a displayed decimal distance value in the form of binary logic signals.

3. The delay-simulator claimed in claim 1, wherein said controlling means comprises a computer which transmits, to said changing means a displayed decimal distance value in the form of binary logic signals.

4. The delay-simulator claimed in claim 1, wherein said means for generating said first signal comprises a parallel-connection, between said receiving means and a signal mixer having two inputs, of a reference delay-line, of value τref, which provides one input signal to said signal mixer, and of a conductor which transmits by means of another coupler, a fraction of the received wave signal, as a second input signal to said signal mixer, said signal mixer beating subtractively between its two input signals, in order to generate said second signal at the frequency fref.

5. The delay-simulator claimed in claim 1, wherein said means for generating said second signal comprises a series-arrangement of a phase-locked loop, which receives said first signal and a first programmable divider, said phase-lock loop comprising a second programmable divider, dividing by a factor M, a phase comparator for comparing the phase of said first signal with an output of said second programmable divider, at least one loop filter connected to the output of said phase comparator, and a voltage controlled oscillator having an input connected to the output of said loop filter and an output connected to an input of said second programmable divider, said first programmable divider being connected to receive an output signal of said loop for dividing the loop output signal by an integer N, in a manner such that the said ratio of the said frequencies, fd and fref is equal to M/N.

6. The delay-simulator claimed in claim 5, wherein said loop filter comprises a plurality of low-pass filters which are arranged in parallel, the change-over from one filter to another being controlled by said controlling means.

7. The delay-simulator, claimed in claim 5, wherein said voltage-controlled oscillator is formed by a plurality of elementary oscillators, the frequency-ranges of which partially overlap, in a manner such that the total frequency range at the output terminal of the voltage controlled oscillator may vary from a few megahertz to several hundred megahertz.

8. A delay-simulator claimed in claim 1, wherein means for generating said second signal comprises a series-arrangement of a frequency-to-voltage converter including a low-pass filter means, a programmable voltage attenuator, and a voltage-controlled oscillator.

9. The delay-simulator claimed in claim 8, wherein said low-pass filter means comprises a plurality of low pass filters which are arranged in parallel, the change-over from one filter to another being controlled by said controlling means.

10. The delay-simulator as claimed in claim 1, further comprising an internal distance-measuring apparatus for testing the operation of said delay-simulator.

* * * * *

UNITED STATES PATENT AND TRADEMARK OFFICE
CERTIFICATE OF CORRECTION

PATENT NO. : 4,661,818
DATED : April 28, 1987
INVENTOR(S) : Michel RIFFIOD and Jean-Pierre TOMASI It is certified that error appears in the above-identified patent and that said Letters Patent is hereby corrected as shown below:

Column 5, line 52:
   Replace "homogeneous, at one" with --measurable by using a unit of--;

Column 6, lines 11 and 12:
   Replace "homogeneous, at one" with --measurable by using a unit of--;

Column 8, line 62:
   Amend equation "(13)" to read $f_b = (M/N) \cdot \tau_{ref} \cdot P + \tau_i \cdot P$ Column 11, line 39:
   Replace "0. $\mu S$" with --0.1 $\mu S$--;

Column 12, line 11:
   Replace "$A=P/(1^n - 1)$" with --$A=P/(2^n-1)$--;

Column 13, lines 24 and 29:
   Replace "(24)" with --(25)--.

Signed and Sealed this

Second Day of August, 1988

Attest:

DONALD J. QUIGG

Attesting Officer      Commissioner of Patents and Trademarks